July 11, 1961

P. F. NIESSEN 2,992,151

GASKETING MATERIAL

Filed Aug. 16, 1957

INVENTOR.
Paul F. Niessen,
BY George H. Simmons
Atty

July 11, 1961 P. F. NIESSEN 2,992,151
GASKETING MATERIAL
Filed Aug. 16, 1957 3 Sheets-Sheet 2

INVENTOR.
Paul F. Niessen,
BY George H. Simmons
Atty

INVENTOR.
Paul F. Niessen
BY George H. Simmons
Atty

United States Patent Office 2,992,151
Patented July 11, 1961

2,992,151
GASKETING MATERIAL
Paul F. Niessen, Wheaton, Ill., assignor to Victor Manufacturing & Gasket Co., Chicago, Ill., a corporation of Illinois
Filed Aug. 16, 1957, Ser. No. 678,580
5 Claims. (Cl. 154—43)

This invention relates to materials from which gaskets may be made, and has for its principal object the provision of new and improved material of this type.

It is a main object of the invention to provide a gasketing material which may be advantageously used in the fabrication of gaskets for sealing between the heads and the blocks of internal combustion engines, which gaskets are capable of maintaining seal against high heat and high pressures developed in the engine, and are not affected by oil, gas or coolants.

Another object of the invention is to provide a gasketing material from which can be fabricated cylinder head gaskets that are sufficiently resilient to form a tight seal between engine heads and blocks which have sealing surfaces that are finished to commercial smoothness only, when clamped between those surfaces by the amount of clamping pressure recommended by the engine manufacturer.

Another object of the invention is to provide a gasketing material from which can be fabricated cylinder head gaskets capable of maintaining seal between the heads and blocks of internal combustion engines even though the sealing surfaces thereof contain imperfections such as tool marks, scratches, sand holes, and the like.

Another object of the invention is to provide a gasketing material from which can be fabricated cylinder head gaskets which when clamped in seal forming engagement with the heads and blocks of internal combustion engines are sufficiently rigid to minimize or eliminate movement of the heads with respect to the blocks during operation of the engines.

Another object of the invention is to provide a gasketing material capable of effecting good transfer of heat through the material in directions parallel to the surfaces of the material and also at right angles to those surfaces.

Another object of the invention is to provide a gasketing material out of which can be made general purpose gaskets to seal against high pressures and high temperatures, which gaskets are impervious to oils, greases and solvents.

Further objects of the invention not specifically mentioned here will be apparent from the detailed description and claims which follow, reference being had to the accompanying drawings in which a preferred embodiment of the invention is shown by way of example and in which:

Figure 1:
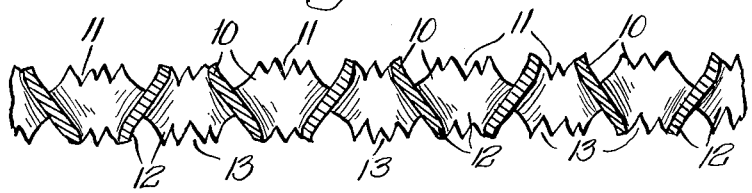
FIG. 1 is a cross sectional view through one form of metallic core, taken diagonally therethrough and drawn to a scale of approximately 20 to 1.

Manufacturers of internal combustion engines having high compression ratios, such as are commonly used in the automotive industry, require that the cylinder head gasket used be relatively thin. Thin gaskets of the prior art of which I am aware, while they are capable of forming a satisfactory seal when the sealing surfaces on the head and block are good, fail when those surfaces contain imperfections such as tool marks, scratches, sand holes and the like. As a result, the engine manufacturer is required to discard many heads and blocks which could be used if better sealing cylinder head gaskets were available.

These prior art thin cylinder head gaskets permit objectional movement of the head with respect to the block during operation of the engine. This movement hammers out the gasket with the result that clamping pressure, usually measured in foot pounds of torque on the studs, is lost and leakage at the gasket develops and engine power is lost.

The present invention seeks to provide an improved gasketing material from which can be fabricated cylinder head gaskets for sealing the heads to the blocks of such engines, which gaskets possess improved performance characteristics.

The gasketing material of the present invention employs as a core a sheet of metal which has been expanded laterally in the manner taught in the co-pending application of John H. Victor, Serial No. 654,777, filed April 24, 1957. This treatment of the metal produces a core having a plurality of closely spaced together projections rising out of each of its faces, which projections are arranged in rows, with the rows of projections on one face disposed midway between the rows of projections on the other face. The projections may be pierced at or near their apexes as is the result when the process of this co-pending application is applied to metal that is sufficiently thin that the stretching thereof exceeds the elastic limit of the metal. When the process is applied in such a manner that the stretching does not exceed the elastic limit of the metal, the metal is not pierced and as a result the projections are in the form of hollow knuckles rising out of the faces of the sheet.

The core stock produced by the above process contains a plurality of pockets indented into each of its faces, as well as a plurality of projections extending out of each of its faces. The surface area on each face of the stock is increased approximately twofold, that is, each square inch of stock contains approximately two square inches of surface area on each of its faces.

The gasketing material of the present invention is formed by applying to core metal of this type, homogeneous elastomeric materials that form facings on the two sides of the core. The facing material is applied under sufficient pressure to insure that it is in intimate engagement with the entire surface area of the core and that there are no air pockets entrapped between the core and facing material. The facing material is bonded to the core and is of sufficient thickness to cover the apexes of the projections rising out of the core. The exposed faces of the facing material may be coated with a material that controls the adherence of the facings to the machine parts with which it comes into contact.

A cylinder head gasket fabricated from the gasketing material of the present invention has been found to be sufficiently resiliently to form a seal with the sealing surfaces on the head and block of an engine, even though those sealing surfaces contain imperfections of sufficient magnitude to render impossible the formation of a seal by prior art gaskets. My improved gaskets, when clamped between the head and block of an engine under the clamping pressure specified by the manufacturer of the engine, have been found to be sufficiently rigid that, during operation of the engine, movement between the head and block is reduced sufficiently to improve the performance of the engine.

The elastomeric material forming the faces of the gasket expands responsive to the heat generated in the engine thereby to tighten the seal between the head and block so as to insure adequate sealing thereof even though the sealing surfaces contain numerous imperfections.

With the facings of the gasket coated with a material suitable to control the adherence of the material in these facings with the head and block, the desired degree of adherence can be obtained and the gasket can be removed from the head and block without leaving portions of the facing material adhered thereto.

The invention will be best understood by reference to the accompanying drawings.

In FIG. 1, I have shown a sheet of gasketing material of the type produced by the teachings of the above Victor application, which material contains a plurality of hollow projections 10 in its obverse face, each of which projections is ruptured at or near its apex, as indicated at 11. The material also contains hollow projections 12 depending from its reverse face, which projections are also pierced at or near their apexes, as indicated at 13. Preferably the projections 10 are located in rows, are uniformly spaced in the rows, and are centered .050 of an inch apart therein. The rows are likewise centered .050 of an inch apart with the result that there are 400 projections 10 per square inch of the obverse face of the core, and 400 projections 12 per square inch on the reverse face of the core. Since each projection on each of the faces is pierced, the core will contain 800 openings per square inch. Since the projections 10 and 12 are hollow, the core contains 400 pockets per square inch on each of its faces. These pockets are defined in their lower portions by the interior walls of the projections, and in their upper portions by the exterior walls of the projections rising out of the face of the core in which the pockets are located.

After the core has been thoroughly de-greased, it is dipped in an adhesive that is water thin and drained, with the result that the exposed surfaces of the core are coated with a thin coating of adhesive. After the adhesive thus applied has been dried, a homogeneous elastomeric material 15 is applied to the obverse face of the core and a homogeneous elastomeric material 16 is applied to the reverse face thereof. Ordinarily materials 15 and 16 will be of the same composition, although if desired they may differ.

The homogeneous elastomeric materials may be applied to the two faces in a number of ways within the teachings of my invention. If desired, the material may be formed into a sheet of desired thickness and the sheet applied to the core prior to curing of the material in it. Also, if desired, the homogeneous elastomeric material may be mixed with sufficient solvent to reduce it to such a consistency as to be pliable, and the material then applied to the core while in this pliable state.

In either case, the material is applied to the core under sufficient pressure to insure that it will be forced into intimate contact with the entire exposed surfaces of the core material and to insure that no air pockets are trapped between the material and the core. The adhesive coating on the exposed surfaces of the core adheres the material to the core. In the case of the pliable mix the solvent content of the elastomeric material is then reduced, preferably by the application of heat, which process cures the material partially and also bonds the material to the core. The gasketing material thus formed is finished by applying a surface coating 17 to its obverse face and a surface coating 18 to its reverse face. Coatings 17 and 18 are for the purpose of controlling the adherence of the gasketing material to the machine parts with which it comes into contact. The gasketing material is thus completed in readiness to be fabricated into gaskets as required.

The core material shown in FIGS. 1 to 4 of the drawings contains pierced projections on both faces, as above. Since the core is pierced, application of the elastomer facing materials in either of the above manners results in forcing the material 15 on the obverse face and the material 16 on the reverse face, each into contact with the other through the perforations 11 and 13 in the core. Subsequent application of heat and pressure on the material fuses the same together with the result that the bond between the elastomeric facing materials and the core is augmented at a plurality of points.

In FIGS. 5 to 8, inclusive, I have shown a core material which contains knuckles 20 rising out of its obverse face and knuckles 21 depending from its reverse face. None of the knuckles 20 or 21 are pierced. Elastomeric material 22 is applied to the obverse face of the core and material 23 to the reverse face thereof. In each case the facing material is forced onto the core as above and is thick enough to extend over the apexes of the knuckles. Prior to placing the facing materials 22 and 23 on the core, the core is de-greased and coated with an adhesive as before, with the result that the facing materials 22 and 23 become bonded to the core at all points of engagement therewith. Facing coatings of material to control adherence of the elastomeric material with the machine parts with which it comes into contact is applied to the two faces of the material, as indicated at 24 and 25.

Figure 5:
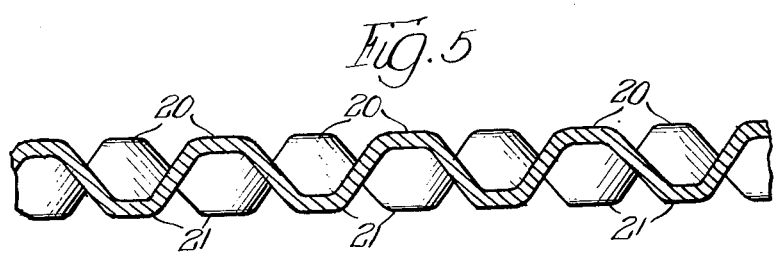
FIG. 5 is a view similar to FIG. 1, showing another form of metallic core material.
Figure 6:
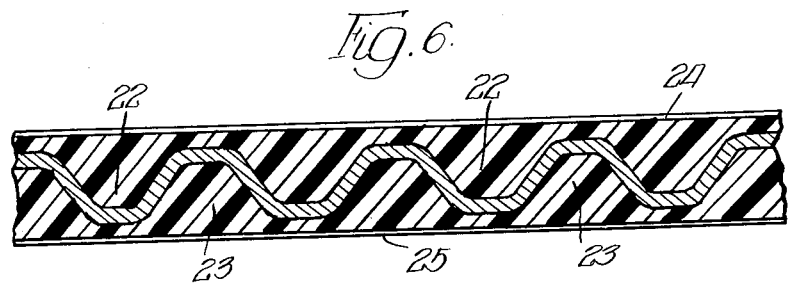
FIG. 6 is a view similar to FIG. 2, showing the elastomeric material applied to the core material shown in FIG. 5.
Figure 7:
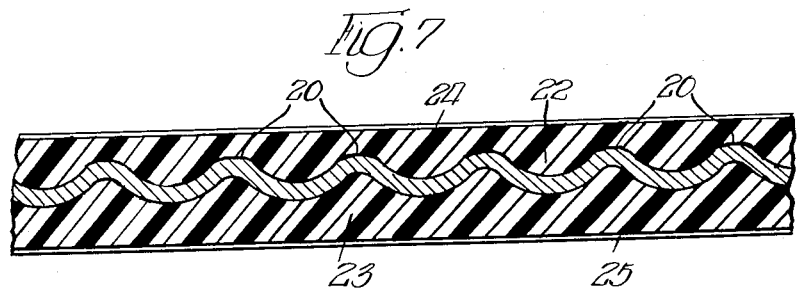
FIG. 7 is a view similar to FIG. 6, but taken through the center of a row of knuckles on the obverse face of the core.
Figure 8:
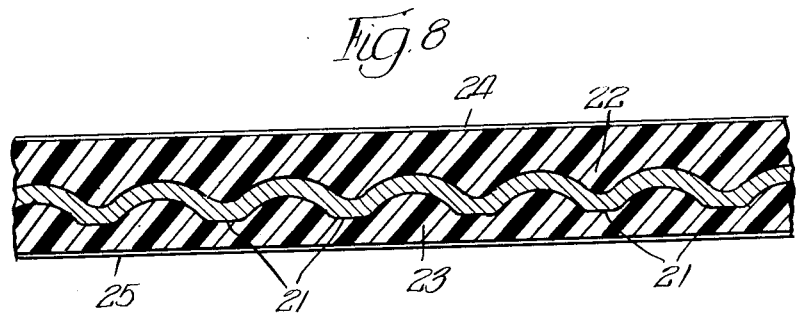
FIG. 8 is a view similar to FIG. 7, but taken through the center of row of knuckles on the reverse face of the core.

The particular composition of the elastomeric materials 15 and 16 applied to the core shown in FIG. 1, and 22 and 23 applied to the core shown in FIG. 5, may be varied within the teachings of the invention. Preferably this material contains as a filler finely comminuted inert material, such as asbestos fibers, metal powder or barytes, etc., or any combination of these materials. These ingredients are bound together by an elastomeric binder which may be polychloroprene, butadiene styrene, butadiene acrylonitrile, polytetrafluoro, ethylene, polyacrylics, trifluoro ethylene, siloxanes, together with such vulcanizing agents, stabilizers, lubricants and plasticizers as may be required, depending upon the base elastomeric material used.

Butadiene acrylonitrile, commonly known as Buna N, possesses many advantages as a binder in sealing materials. It is noted for its heat and abrasion resistance and for its resistance to swelling in gasoline and oil. It is unaffected by water, dilute acids and alkalies, and salt solutions. Membranes in which Buna N is the binder are generally conceded as being unsuitable for use in cylinder head gaskets as such membranes and gaskets cut therefrom lack internal strength sufficient to resist the pressures encountered in the cylinders of an internal combustion engine, and as a consequence the gasket soon blows out. Through the teachings of the present invention, reinforcement of the sealing membranes or surfacing materials is sufficient to enable the gasketing material to withstand these pressures and as a result the use of Buna N material in a cylinder head gasket is rendered possible and the advantages of this material thus made available for use in such gaskets. Elastomeric materials having any of the other binders listed above are also made available for use in cylinder head gaskets if desired.

Figure 2:
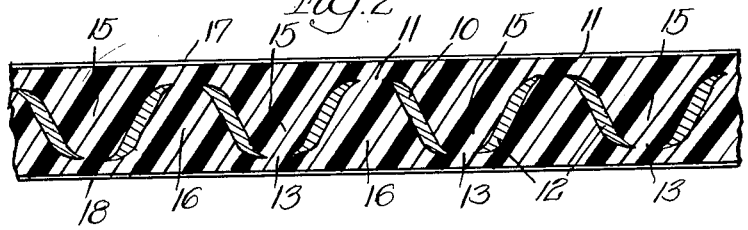
FIG. 2 is a view similar to FIG. 1, with the elastomeric material applied to the core.
Figure 3:
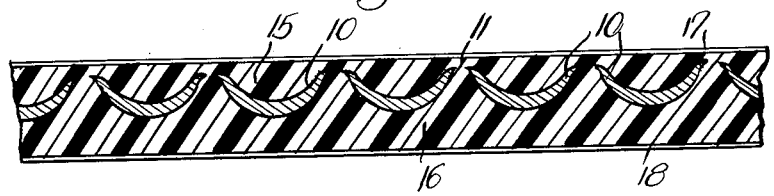
FIG. 3 is a view similar to FIG. 2, but taken through the center of a row of projections on the obverse face of the core.
Figure 4:
FIG. 4 is a view similar to FIG. 3, but taken through the center of a row of projections on the reverse face of the core.
Figure 9:
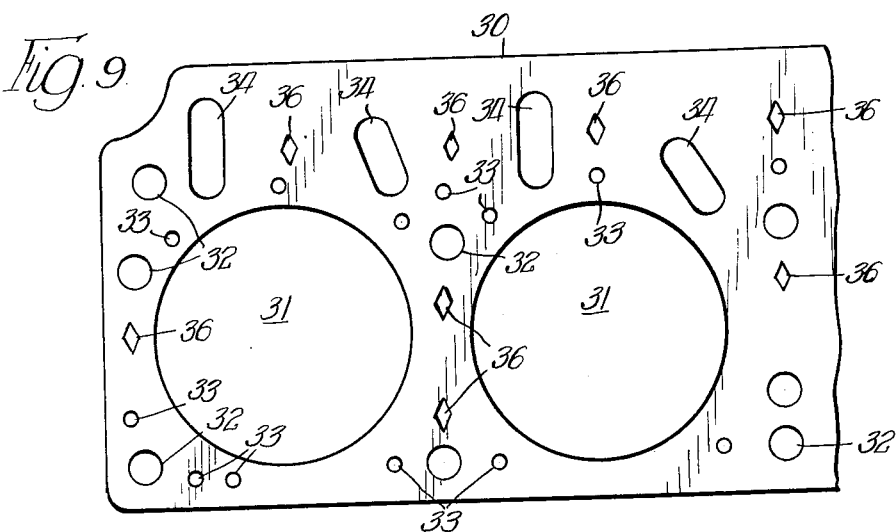
FIG. 9 is a plan view of a portion of a typical cylinder head gasket embodying the teachings of the present invention and drawn to a reduced scale.

In FIG. 9, I have shown a typical cylinder head gasket composed of either one of the materials of the present invention as above. This gasket 30 contains combustion openings 31, stud holes 32, coolant openings 33, and openings 34, through which valve push rods and the like are extended. In one instance a gasket of this type was made with a core of the type shown in FIG. 1, which core was composed of .007 steel expanded to an effective thickness of .030 of an inch and having pierced openings at the apexes of the projections. To this core was applied facing materials 15 and 16 comprising 85% asbestos fibers and 10% Buna N elastomer as a binder, and 5% auxiliaries such as vulcanizing agents, stabilizers, etc. The facings 15 and 16 were applied in sheet form and the sandwich so formed was run between calender rolls and sufficient pressure and heat applied to the sandwich to reduce it to a finished thickness of .032 of an inch. The facing materials 15 and 16 extended over the apexes of the projections in thickness approximately .003 of an inch, and during the calendering operation the edges of the perforations 11 and 13 in the core were no doubt rolled down somewhat, as indicated in FIG. 2. The material so formed was coated with a coating material containing graphite which increased the thickness of the material but slightly. The gasket of the type shown in FIG. 9 was then fabricated from this material.

In another test sample, a core of the type shown in FIG. 5, formed from tin plated steel of .009 thickness, was expanded to an effective thickness of .023 of an inch, and this core, after de-greasing and coating with an adhesive, was covered with facing materials composed of the above mentioned elastomeric material reduced to dough form and rolled on the core in sufficient thickness to cover the apexes of the knuckles to a depth of about .003 of an inch and to form the sandwich to a finished thickness of .032 of an inch. A surface coating, indicated at 24 and 25, was then applied to both faces of the material, after which the gasket of the type shown in FIG. 9 was fabricated from it.

It will be noted that in the gasket shown in FIG. 9 there are no metallic rings around the combustion openings 31 or the coolant openings 33. As a result, when these openings are cut in the gasketing material, the metallic core therein is exposed. As a result this core is exposed to the gases in the engine cylinder and also to the coolant flowing through the coolant openings. Heat picked up by the core from the gases flows laterally through the core to the cooler portions thereof adjacent the coolant openings. This draining away of the heat from the hottest portions of the gasket prevents burning of the elastomeric material in these portions.

As pointed out above, the gasketing material from which the gasket is cut preferably includes elastomeric material which is but partially cured prior to fabrication of the gasket. When the gasket is put to use in an engine, the heat thereof and the pressure applied to the gasket combine to vulcanize the elastomeric material. Since this material expands when heated, it is forced into intimate contact with the sealing surfaces engaging it and into irregularities in those surfaces to insure good sealing.

In order to determine the performance of the gaskets so made, in use between the head and block of an internal combustion engine, auxiliary test openings 36 were punched in the gaskets. The openings so punched were circular; however, in FIG. 9, I have shown them as diamond shape to distinguish from the openings regularly found in the gasket. The thickness of the gasket was then accurately measured at several points adjacent each opening 36. After the gasket was registered with the block of the engine, a lead sphere .060 inch in diameter was inserted into each of the openings 36. The head was then placed on the gasket and the studs tightened down in the order specified by the engine manufacturer to the torque recommended, which in the engine used for test purposes was a torque of 85 foot pounds on each stud. The engine being a V-block engine, the gasket with a perforated core was put on one side of the block and the gasket with the knuckle core was put on the other side of the block. After all of the studs have been torqued down to the required extent, they were loosened, the heads were removed, and the lead pellets carefully measured to determine the extent to which the gasket was compressed by the stud pressures used. The gaskets were accurately measured in the regions of the openings 36 to determine the recovery of the gasket when the pressure on it was released.

These measurements having been completed, the gaskets were re-registered with their respective sides of the block, new lead spheres placed in the openings 36, and the heads again tightened down onto the block under the same conditions and to the same foot pounds of torque on the studs as before. Water was then admitted to the cooling chambers of the engine under a pressure of 40 pounds per square inch and the engine carefully examined for water leaks. No leaks being found, the engine was then started and run on test in accordance with the manufacturer's standard breakdown test procedure. This procedure involves running the engine at full power development at 2800 r.p.m. for an extended period and discontinuing this run at intervals of varying duration to permit cooling of the engine, such cooling being allowed to extend overnight, during which the engine cooled down to room temperature. The test was continued to the standard test time of thirty (30) hours' running time, after which torque wrenches were applied to the studs to determine what torque loss had developed during the test. The heads were then removed, the lead pellets carefully measured to determine their thickness, the gasket removed from the head and block and carefully measured to determine its thickness in the regions adjacent the openings 36, and the general condition of the gaskets, block and head noted as follows.

The gasket containing the knuckle type core shown in FIG. 5, prior to insertion between the head and block, measured .032 inch in the regions adjacent the openings 36. After the head had been tightened down as above and then removed, the lead pellets measured from .030 to .032, with a majority of the pellets measuring .0305 in thickness. This indicates that the gasket was compressed about .0015 of an inch at the majority of the points, although it was compressed to the extent of .002 of an inch at some points and apparently not compressed at all at other points. The variation in compression noted was due to variations in the sealing surfaces on the head and block.

After removal of the pressure, the gasket was again accurately measured in the regions of the openings 36 and it was found that in a majority of instances the gasket recovered to a thickness of .031, this being increased to .0315 in certain instances and to .032 in the regions where apparently no compression of the gasket took place. Thus the gasket showed from .0005 inch to .001 inch recovery upon removal of force compressing it.

At the end of the breakdown test as above, torque on the studs was measured with the torque wrench used to tighten them on and no loss of torque was noted. The lead spheres in openings 36 measured between .028 inch and .031 inch with a majority measuring .0285 inch, indicating that during the test period the head had been moving with respect to the block through approximately .002 of an inch. The gasket was again measured in the regions of the openings 36 and found to measure between .028 inch and .031 inch with a majority of the points measuring .0285 inch. Thus during the test, the gasket had acquired a permanent set and loss of thickness of approximately .0035 of an inch from its original thickness.

Since the lead slugs used in the torque-down test were compressed to a thickness of .0305 and those used in the breakdown test were compressed to a thickness of .0285 during the test, some loss of torque was undoubtedly present; however, this loss was apparently too small to be detected with the torque wrench used.

The gasket containing the core shown in FIG. 1, prior to being registered with the head and block, measured .032 inch. The lead pellets in openings 36, after the head had been torqued down on the block as above and then removed, measured uniformly .0295 inch, indicating a uniform compression of the gasket of .0025 inch. The gasket was then measured in the region of the openings 36 and found to vary from .030 inch to .0315 inch, with a majority of the points measuring .031, indicating recovery of the gasket to within .001 of its original thickness.

After the breakdown test had been run as above, the torque on the studs was tested and found to be 80 foot pounds, indicating a torque loss of 5 foot pounds. Such loss is less than that of prior art gaskets of which I am aware. The head was then removed and the lead pellets were found to measure from .024 inch to .026 inch, indicating a movement between the head and block of approximately .005 of an inch during the test. The gasket, measured in the region of the openings 36, also measured between .024 and .026 inch, indicating no recovery, and a permanent set and loss of thickness of approximately .007 from its original thickness.

Examination of the gaskets at the end of the test revealed no evidence of burn-through between the cylinders or elsewhere out of the combustion chambers, no evidence of gas leakage between the gasket and head or block, and no evidence of coolant leakage around the coolant openings. Thus an elastomeric material containing a Buna N binder, when combined with a metallic core designed to reinforce the material and to effect lateral transfer of heat through the gasket, can successfully withstand the pressure built up in the combustion chamber as the cylinder fires. Thus through the teachings of the present invention, the use of Buna N elastomer can be extended to cylinder head gaskets and the desirable characteristics of this elastomer can be utilized in such gaskets.

The core used in the gaskets of the present invention, either the knuckle type or the pierced type, reinforces the elastomeric material by forming in it a plurality of masses nested in and bonded to the pockets in the core. The projections on the two faces of the core, being generally pyramidal in shape and projecting into close proximity to the faces of the gasket, provide additional reinforcement through mechanically blocking movement of the facing material and also through the bonding of the material to the projections. Since the exposed surface on each face of the core per unit area is approximately twice that area, a strong bond is assured. These reinforcements and the molecular cohesion in the material, working together, enable the gasket to withstand the pressures built up in the cylinder and blowout is prevented. Lateral transmission of heat through the gasket drains off the heat, to which those portions of the gasket in contact with the gases in the cylinders are exposed, from those portions sufficiently rapidly to prevent burning of the elastomeric material. No burning or disintegration of this material was noted, even at the edges of the combustion openings in the gasket, at which points the elastomeric material was in direct contact with the gases in the cylinders. Adherence of the facing material to the sealing surfaces on the head and block aided in preventing leakage of gases past the gasket.

The gaskets used in the above tests adhered to the head and block sufficiently to require considerable force to separate the gasket from the sealing surfaces, but the adherence was not sufficient to cause any of the facing material of the gaskets to remain on the head or block. The gasket with the knuckle core showed some evidence of separation of the elastomeric material from the core, indicating a need for a stronger bond therebetween or for a lower adhesion to the head and block. The gasket with the pierced core showed no evidence of such separation. Since the core contained perforations through which the elastomeric material on the two faces of the gasket extended, the facings were fused together by the heat developed in the engine during the test. This additional reinforcement of the bond between the elastomeric material and the core permits the use of higher adherence of the material to the sealing surfaces without danger of tearing the material from the core when the gasket is removed.

These tests show that gaskets having the knuckle type core were initially compressed less than those having the pierced core in the ratio of .0015 to .0025. The pierced core permitted more movement of the head in the ratio of .005 to .002, had greater torque loss in the ratio of 5 foot pounds to an estimated 2 foot pounds. The more resilient pierced core gasket lost more of its original thickness during the test in the ratio of .007 to .0035, and neither gasket displayed measurable recovery after the test. These tests also show that both gaskets are capable of establishing and maintaining seal even though the sealing surfaces on the head and block contain imperfections sufficient to cause little or no compression of parts of the gasket as the head is tightened onto the block.

Elastomeric material is a poor conductor of heat, as are other compressible materials, due to air pockets entrapped in the material. The elastomeric material used in the gasketing material is made as homogeneous as possible and as dense as possible through elimination of entrapped air. In affixing the elastomer to the core, care is taken to prevent entrapment of air between the elastomer and core, with the result that the gasketing material, with its metallic core and lateral transfer of heat therethrough, performs satisfactorily from a heat transfer standpoint. The projection of the metal in the core into close proximity to the surfaces of the gasketing material aids in the transfer of heat from surface to surface of the material.

The heat conductance of the elastomeric material can be improved by incorporating therein, as a filler, a good conductor of heat such as, for example, a powdered metal, should it be found desirable to do so. A material as above, having 10% powdered metal filler, substituted for a like amount of asbestos fibers, has been found to have heat conductance properties greatly improved over those of similar material that contains no metallic powder.

Figure 10:
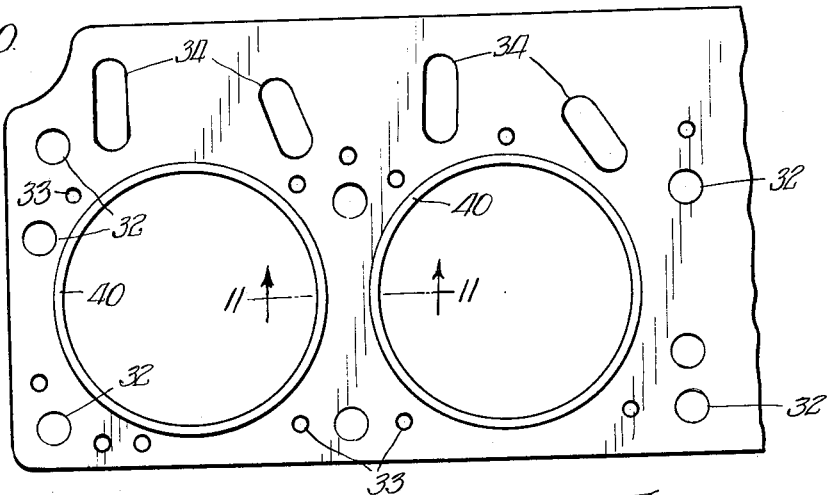
FIG. 10 is a view similar to FIG. 9 and showing a modified form of gasket.
Figure 11:
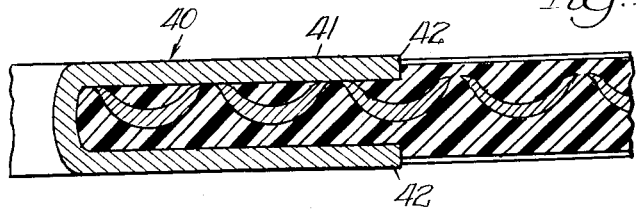
FIG. 11 is a fragmentary cross sectional view similar to FIG. 3, taken along the line 11—11 of FIG. 10, looking in the direction of the arrows and drawn to the same scale as FIG. 3.

The breakdown test outlined above indicates that it is not necessary to have a metallic facing around the combustion openings in a gasket fabricated from the gasketing material of the present invention; however, some manufacturers specify such facings, and in FIG. 10, I have shown a gasket of the type shown in FIG. 9, equipped with metal rings 40 surrounding the combustion openings in the gasket. As will be seen in FIG. 10, the gasket is fabricated from material having either a knuckle type or a pierced metal type of core, and after the gasket has been blanked out from this material it is reduced in thickness adjacent the combustion openings sufficiently to receive the ring 40 in such manner that the outer faces 41 and 42 of that ring project above the two faces of the gasket a distance substantially less than the thickness of the metal in ring 40, and preferably totals about .003 of an inch, that is, about .0015 of an inch on each face of the gasket, as indicated at 42. With a gasket of this type, as the head is clamped down onto the block, the faces of the ring 40 will be forced together, thereby adding additional compression to the gasket in the regions of the combustion openings.

In reducing the thickness of the gasket adjacent the combustion openings therein, the elastomeric material overlying the apexes of the projections on the core is cut away. Portions of these apexes are likewise cut away. As a result, the ring 40 has metal-to-metal contact with the core of the gasket. The ring 40 will be in direct contact with the gases in the combustion chamber and through the metal-to-metal contact of the ring with the core, the lateral transfer of heat through the core characteristic of the gasket is maintained. The seal forming characteristics of the gasket are maintained.

From the foregoing, it will be apparent that by reinforcing, with a metallic core of particular design, a gasketing material having sealing surfaces formed of an elastomeric material containing Buna N as a binder, I have produced a material which when fabricated into a cylinder head gasket produces a gasket that possesses many desirable operating characteristics.

While I have illustrated my gasketing material by showing and describing cylinder head gaskets made from it, I have done so by way of example only. The material may be used to form other types of gaskets and such use is contemplated within the teachings of the invention.

Having thus complied with the statutes and shown and described a preferred embodiment of the invention, what I consider new and desire to have protected by Letters Patent is pointed out in the appended claims.

What I claim is:

1. A gasket material comprising: a resilient metallic core having an effective thickness of at least three times the thickness of the metal from which it is made, said core having 400 generally pyramidal sockets indented into each square inch of its obverse face, which sockets are uniformly spaced apart in uniformly spaced apart rows that extend longitudinally and transversely of the core, the walls of said sockets forming projections rising out of the reverse face of the core; said core also having 400 generally pyramidal sockets indented into each square inch of its reverse face, which sockets are uniformly spaced apart in uniformly spaced apart rows that extend longitudinally and transversely of the core and are located midway between the adjacent rows and sockets in the obverse face, the walls of said reverse face sockets forming projections rising out of the obverse face of the core, each of the four corners of the sockets in each face of the core registering with and extending into a corner of a projection rising out of that face, said projections augmenting the effective depth of the sockets to form 400 pockets per square inch in each face of the core; and a sheet of resilient facing material bonded to each face of the core, which material fills the pockets therein, encompasses the projections rising out of that face and extends over the apexes of those projections, said facing material comprising asbestos fibers bound together by a readily deformable synthetic rubber binder.

2. A gasket material comprising: a resilient metallic core having an effective thickness of at least three times the thickness of the metal from which it is made; said core having 400 generally pyramidal sockets indented into each square inch of its obverse face, which sockets are uniformly spaced apart in uniformly spaced apart rows that extend longitudinally and transversely of the core, the walls of said sockets forming projections rising out of the reverse face of the core; said core also having 400 generally pyramidal sockets indented into each square inch of its reverse face, which sockets are uniformly spaced apart in uniformly spaced apart rows that extend longitudinally and transversely of the core and are located midway between the adjacent rows and sockets in the obverse face, the walls of said reverse face sockets forming projections rising out of the obverse face of the core, each of the four corners of the sockets in each face of the core registering with and extending into a corner of a projection rising out of that face, each square inch of said core containing approximately two square inches of surface area on each of its faces; and a sheet of resilient facing material bonded to each face of the core, which material fills the sockets therein, encompasses the projections rising out of that face and extends over the apexes of those projections, said facing material comprising asbestos fibers bound together by a readily deformable synthetic rubber binder.

3. A gasket material as specified in claim 2, in which each projection contains an irregularly shaped opening adjacent its apex to form 800 openings per square inch of the core through which openings the facing materials on the faces of the core extend each into contact with the other.

4. A gasket material as specified in claim 2, in which the facing material comprises 75% asbestos fibers, 10% powdered metal, and 10% readily deformable synthetic rubber binder.

5. A gasket material as specified in claim 2, in which the facing material comprises 85% asbestos fibers and 10% readily deformable synthetic rubber binder.

References Cited in the file of this patent

UNITED STATES PATENTS

| | | |
|---|---|---|
| 1,068,585 | Hettinger | July 29, 1913 |
| 1,808,774 | Hettinger | June 9, 1931 |
| 1,997,987 | Victor | Apr. 16, 1935 |
| 2,055,471 | Balfe | Sept. 29, 1936 |
| 2,330,106 | Bernstein et al. | Sept. 21, 1943 |
| 2,587,945 | Wirth | Mar. 4, 1952 |
| 2,698,788 | Greenman et al. | Jan. 4, 1955 |
| 2,728,701 | Wirth | Dec. 27, 1955 |
| 2,796,457 | Stinger | June 18, 1957 |

FOREIGN PATENTS

| | | |
|---|---|---|
| 4,921 | Great Britain | 1898 |
| 246,254 | Great Britain | Jan. 28, 1926 |
| 497,279 | Germany | May 5, 1930 |